United States Patent
Wong

Patent Number: 5,903,417
Date of Patent: May 11, 1999

[54] SELF-EXCITATION TYPE SWITCH POWER SUPPLY UNIT WITH OVERCURRENT PROTECTION

[76] Inventor: Tak Tai Wong, Block A, 20th Floor Braemer Hill Mansion, 43 Braemer Hill Road, North Point, The Hong Kong Special Administrative Region of the People's Republic of China

[21] Appl. No.: 08/793,697

[22] PCT Filed: Aug. 30, 1995

[86] PCT No.: PCT/CN95/00071

§ 371 Date: Apr. 23, 1997

§ 102(e) Date: Apr. 23, 1997

[87] PCT Pub. No.: WO96/08067

PCT Pub. Date: Mar. 14, 1996

[30] Foreign Application Priority Data

Sep. 3, 1994 [CN] China ................................ 94115838
Nov. 10, 1994 [CN] China ................................ 94118055

[51] Int. Cl.[6] .................................................. H02H 7/00
[52] U.S. Cl. ........................ 361/18; 361/87; 361/101; 323/277; 363/75

[58] Field of Search .................................... 361/18, 87, 93, 361/100–101, 58; 323/274–277, 293, 316; 363/52–53, 74–76, 77–81

[56] References Cited

U.S. PATENT DOCUMENTS

| 4,236,187 | 11/1980 | Mochizuki et al. | 361/36 |
| 4,323,961 | 4/1982 | Josephson | 363/56 |
| 5,568,343 | 10/1996 | Kosugi | 361/36 |

*Primary Examiner*—Jeffrey A. Gaffin
*Assistant Examiner*—Michael J. Sherry
*Attorney, Agent, or Firm*—Finnegan, Henderson, Farabow, Garrett & Dunner, L.L.P.

[57] ABSTRACT

A self-excitation type switch power supply unit with overcurrent protection. For adopting a simple and reliable current negative feedback protective circuit to coordinate with a complementary bridge circuit, a positive feedback circuit without DC biasing capacitive coupling, an oscillation-starting circuit of the AC power supply, etc., so that the self-excitation type switch power supply can become a practical power supply unit with simple circuitry, small size and low cost.

3 Claims, 2 Drawing Sheets

SELF-EXCITATION TYPE SWITCH POWER SUPPLY UNIT WITH OVERCURRENT PROTECTION

TECHNICAL FIELD

This invention relates to a self-excitation type switch power supply unit with a function of overcurrent protection.

TECHNICAL BACKGROUND

The self-excitation type switch power supply is a self-excited oscillator as to substance, which can be taken as a high-frequency heating means when output directly from a self-excited oscillation coil and as a DC power supply unit when rectified and output from a rectifier. The self-excitation type switch power supply has the advantages of simple circuitry, small size and lost cost, etc., but owing to lack of a simple and effective method for overcurrent protection, its stability and reliability are poor, which makes the self-excitation type switch power supply unable to become a reliable and practical power supply unit.

FIG. 1 is a block diagram of a general self-excitation type switch power supply unit comprising: a power source 1, an amplifier 2, a self-excited oscillation coil 3 and a positive feedback coupling circuit 5. The self-excited oscillation coil 3 comprises a master oscillation coil La, a positive feedback coil Lb and an output coil Lc.

DISCLOSURE OF THE INVENTION

The object of this invention is to provide a self-excitation type switch power supply unit with overcurrent protection, which can simply and effectively overcome the defects of poor stability and reliability of the existing self-excitation type switch power supply.

The object of this invention is fulfilled like this. FIG. 2 is a block diagram of the self-excitation type switch power supply unit to which this invention pertains, besides having the basic structure of FIG. 1, it is characterized in that a current negative feedback impedance 4 which can provide a DC path and contains a series resistance component is connected to the input and output common terminal A of the amplifier 2, the product of the impedance value of said current negative feedback impedance 4 and the predetermined current value of the overcurrent protection point is close to the positive feedback voltage on the positive feedback coil Lb in the self-excited oscillation coil 3. For certain reasons, the increase in the current 10 of the amplifier 2 exceeds the predetermined current value, the negative feedback voltage N on the current negative feedback impedance 4 increases accordingly until it is close to the positive feedback voltage P on the positive feedback coil Lb, for deficiency in the amount of the positive feedback, the oscillation circuit has to stop oscillation to fulfill the object of overcurrent protection.

This invention is only to add and connect the current negative feedback impedance to the input and output common terminal of the amplifier in the existing unit, the problem of overcurrent protection is entirely solved on the basis of that the cost and complication of the unit are almost not increased.

DESCRIPTION OF THE FIGURES

The following are descriptions on the figures and further descriptions are made on the detailed structures and the operation condition of this invention by combination with the embodiments.

BEST MODE FOR FULFILLING THIS INVENTION

Figure 1:
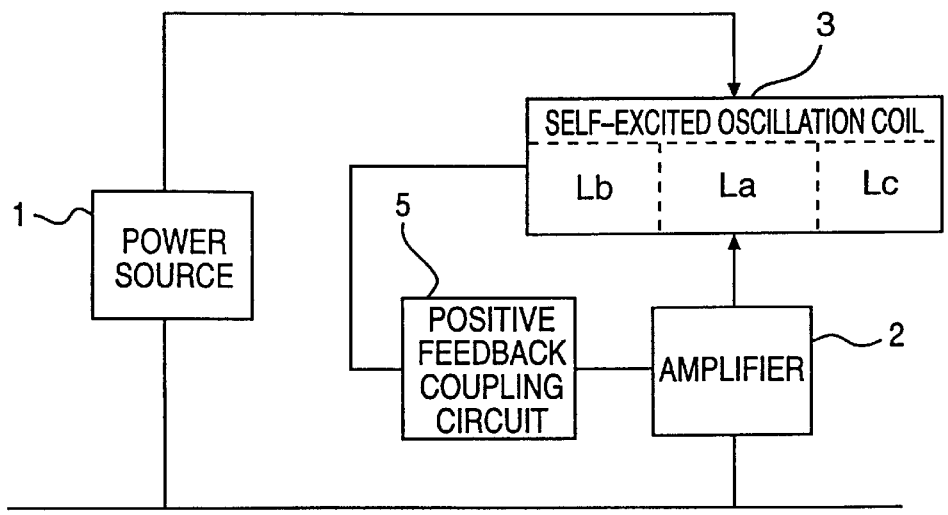
FIG. 1 is a block diagram of a general self-excitation type switch power supply unit.
Figure 2:
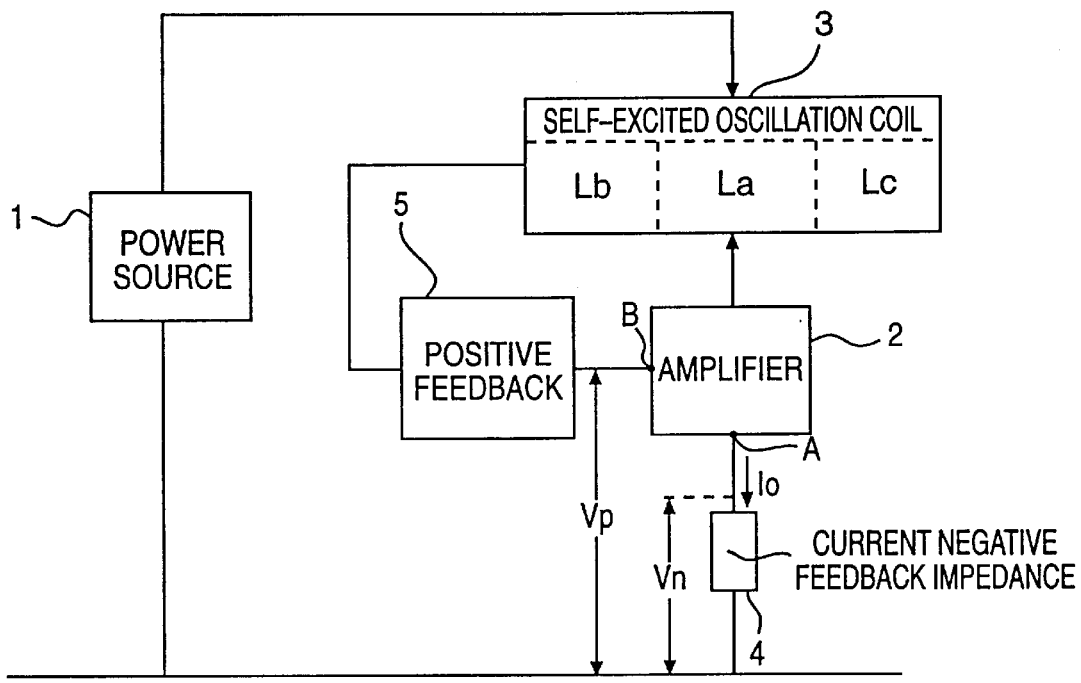
FIG. 2 is a block diagram of a self-excitation type switch power supply unit of this invention.
Figure 3:
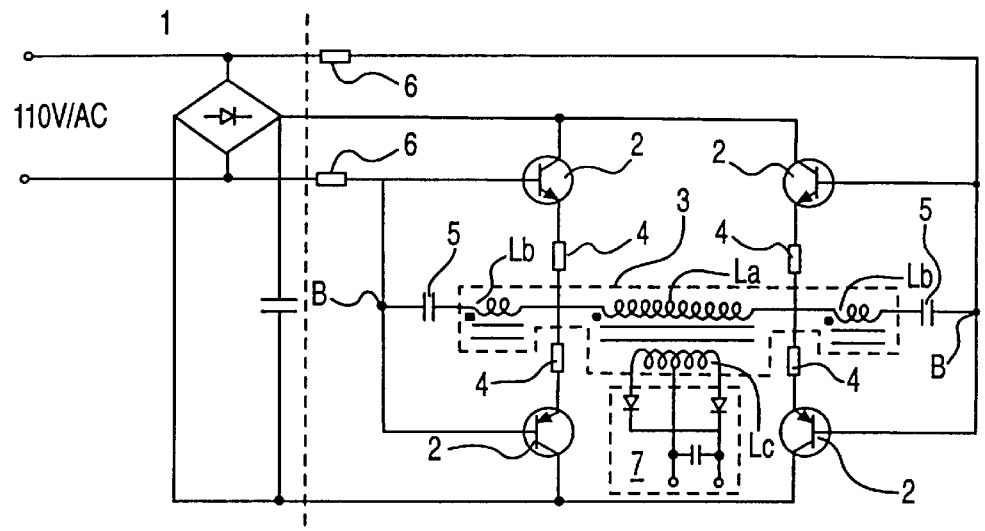
FIG. 3 is a circuitry schematic diagram of one embodiment of the self-excitation type switch power supply unit of this invention.

Refer to FIG. 3, in which a switch power supply unit constituted according to this invention is shown, said unit comprises: a power source 1, an amplifier 2, a self-excited oscillation coil 3, a current negative feedback impedance 4, a positive feedback coupling circuit 5, an oscillation-starting circuit 6 and a secondary rectification circuit 7.

110 V AC power supply is taken as a power source 1 after rectified and filtered. The amplifier 2 uses a pair of complementary amplifiers, which are composed of two complementary amplifiers, of which the input and output common terminals are all added and connected with a current negative feedback impedance 4, then a whole bridge circuit is composed of the two complementary amplifiers. The oscillation coil 3 is composed of the master oscillation coil La, positive feedback coil Lb and output coil Lc. The positive feedback coupling circuit 5 uses capacitor coupling, and the positive feedback circuit is composed by that the positive feedback circuit Lb is connected to the bridge circuit excitation terminal B through the positive feedback coupling circuit 5. The oscillation-starting circuit 6 is composed by that the AC power supply is connected to the bridge circuit excitation terminal B through a current-limiting resistance. The output of the output coil Lc is taken as the output of the DC power source after rectified by the secondary rectification circuit 7.

The whole bridge amplifier has no DC biasing, under the condition that there is no oscillation-starting circuit, the bridge circuit itself cannot start oscillation. In order to make the bridge circuit start oscillation, it is connected to the excitation terminal B of the bridge circuit by the AC power supply through the current-limiting resistance of the oscillation-starting circuit 6. In the function of the AC voltage, the voltage at point B changes, which makes the voltage at the two terminals of the master oscillation coil La changed accordingly in the amplification function of the bridge circuit amplifier to cause the whole bridge circuit to start oscillation in the function of the positive feedback of the positive feedback coil Lb. After the oscillation starting of the bridge circuit, it is no longer affected by the AC power supply, but oscillates according to the natural frequency of the bridge circuit.

The capacitor of the positive feedback coupling circuit 5 performs the function of differentiation, thereby the waveform of the excitation current is improved, which is conducive to decreasing the switching waste of the amplifier so that the efficiency of the whole switch power supply is raised.

For certain reasons, when the increase in the current 10 of the amplifier 2 exceeds the predetermined value, the positive feedback voltage P of the positive feedback coil Lb is neutralized because of the negative feedback function of the current negative feedback impedance 4 to make the amount of the positive feedback insufficient, then the oscillation is stopped so as to fulfill the object of overcurrent protection. After the reason for malfunction is eliminated, the bridge circuit will restart oscillation in the function of the oscillation-starting circuit and the normal operation is resumed.

After rectified by the secondary rectification circuit 7, the output of the output coil Lc of the self-excited oscillation coil 3 can be taken as the output of the DC power source.

Figure 4:
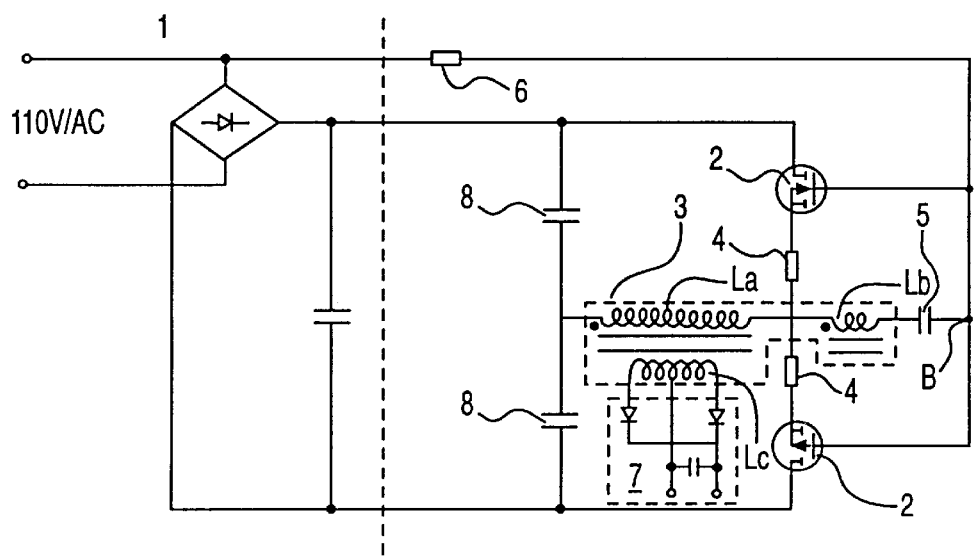
FIG. 4 is a circuitry schematic diagram of another embodiment of the self-excitation type switch power supply unit of this invention.

FIG. 4 is another embodiment of this invention, in which a pair of the complementary amplifiers composed of the amplifiers with a P-channel field-effect transistor and a N-channel field-effect transistor are taken as a semibridge circuit, the other semibridge circuit is replaced with two series capacitors 8, its principle is identical with that of FIG. 3.

I claim:

1. A self-excitation type switch power supply unit with overcurrent protection, comprising:

a power source;

an amplifier having an input and output common terminal and an excitation input terminal, said power source being coupled to said excitation input terminal;

a self-excited oscillation coil including a master oscillation coil, a positive feedback coil and an output coil;

a current negative feedback impedance which can provide a DC path; and a positive feedback coupling circuit, wherein said current negative feedback impedance is series-connected to the input and output common terminal of said amplifier and generates a negative feedback voltage based on a current through the input and output common terminal of said amplifier flowing through said current negative feedback impedance, the positive feedback coil in said self-excited oscillation coil is connected to the excitation input terminal of said amplifier through said positive feedback coupling circuit to generate a positive feedback voltage, and the current negative feedback voltage directly reduces said positive feedback voltage to provide overcurrent oscillation-stopping protection.

2. The power supply unit according to claim 1, wherein said power source is an AC rectification power supply;

said amplifier includes a pair of first complementary amplifiers, each having a pair of second complementary amplifiers of which input and output common terminals are all added and connected with said current negative feedback impedance, such that a whole bridge circuit is composed of said pair of first complementary amplifiers;

said positive feedback coupling circuit uses capacitor coupling such that said positive feedback coil in said self-excited oscillation coil is connected to the excitation input terminal of said amplifier through said positive feedback coupling circuit; and said power supply unit further comprises an oscillation-starting circuit which is connected to the circuit excitation terminal through a current limiting resistance.

3. The power supply unit according to claim 1, wherein said power source is an AC rectification power supply;

said amplifier includes a pair of complementary amplifiers of which input and output common terminals are all added and connected with said current negative feedback impedance, such that a semibridge circuit is composed of two series capacitors and said pair of complementary amplifiers;

said positive feedback coupling circuit uses capacitor coupling such that said positive feedback coil in said self-excited oscillation coil is connected to the excitation input terminal of said amplifier through said positive feedback coupling circuit; and said power supply unit further comprises an oscillation-starting circuit which is connected to the circuit excitation terminal through a current limiting resistance.

* * * * *